United States Patent [19]
Breton et al.

[11] 3,984,044
[45] Oct. 5, 1976

[54] RETENTION MEANS FOR MECHANICAL SEPARATION AND PROCESS OF MAKING SAME

[75] Inventors: Ernest J. Breton, Wilmington, Del.; Julio C. da Ponte, Downingtown, Pa.; Melville E. Pugh, Jr., Wilmington; Dexter Worden, Newark, both of Del.

[73] Assignee: Composite Sciences, Inc., Newport, Del.

[22] Filed: Dec. 17, 1974

[21] Appl. No.: 533,707

Related U.S. Application Data
[62] Division of Ser. No. 402,331, Oct. 1, 1973, abandoned.

[52] U.S. Cl. .................... 228/198; 228/248; 75/208 R; 75/.5 R; 75/134 N; 29/163.5 F; 210/496; 210/510; 260/2.5 M
[51] Int. Cl.² .......................... B23K 31/02
[58] Field of Search .......... 75/.5, 201, 208, 134 N; 210/496, 510; 29/420, 4841420.5, 428, 472.3, 163.5 F; 264/111, 127; 260/2.5 M; 156/290; 228/198, 248

[56] References Cited
UNITED STATES PATENTS

| | | | |
|---|---|---|---|
| 2,739,375 | 3/1956 | Coxe | 228/248 |
| 2,957,235 | 10/1960 | Steinberg | 29/428 |
| 3,365,785 | 1/1968 | Valyi | 29/420.5 |
| 3,378,392 | 4/1968 | Longo | 75/.5 |
| 3,436,512 | 4/1969 | Cape | 75/.5 |
| 3,661,645 | 5/1972 | Strier | 260/2.5 M |
| 3,679,614 | 7/1972 | Shah et al. | 260/2.5 M |
| 3,693,750 | 9/1972 | Takkunen | 210/510 |
| 3,716,347 | 2/1973 | Bergstrom | 75/208 R |
| 3,716,347 | 2/1973 | Bergstrom et al. | 75/208 R |
| 3,717,442 | 2/1973 | Knopp | 75/208 R |
| 3,743,556 | 7/1973 | Breton et al. | 75/208 R |
| 3,772,748 | 11/1973 | Rutt | 29/625 |
| 3,831,258 | 8/1974 | Elbert et al. | 29/420 |
| 3,843,570 | 10/1974 | Murayama | 260/2.5 M |
| 3,943,221 | 3/1976 | Schladitz | 228/198 |

*Primary Examiner*—Charles N. Hart
*Assistant Examiner*—Ernest G. Therkorn
*Attorney, Agent, or Firm*—Connolly and Hutz

[57] ABSTRACT

A sintered filter element for mechanically separating suspended matter from a liquid or gaseous fluid medium to clarify same, comprising at least two laminated, porous, plate-like filter structures having relatively large planar front and rear surfaces joined by relatively small edge surfaces arranged substantially parallel to each other and spaced up to about five, preferably less than one, inches apart. Each filter structure comprises at least two contacting and adhered, substantially coextensive porous layers whose pores are in open communication over substantially all of the interface between their contiguous surfaces so as to permit flow of the fluid medium from one layer to the other. One of the layers is a retention layer for the suspended matter having a pore size sufficiently small substantially to prevent passage of the suspended matter to be removed from the fluid medium and the other of said layers is a supporting layer having a pore size larger than the pore size of the retention layer. The ratio of the surface area of the retention layer to the volume of filter element is between about 4 and about 60 and the filter element is adapted to be secured within the filter cavity of an extended area filter whereby fluid medium to be clarified is passed through the filter element and out of the filter cavity after it has passed through both the retention layer and supporting layer of each filter structure.

3 Claims, 10 Drawing Figures

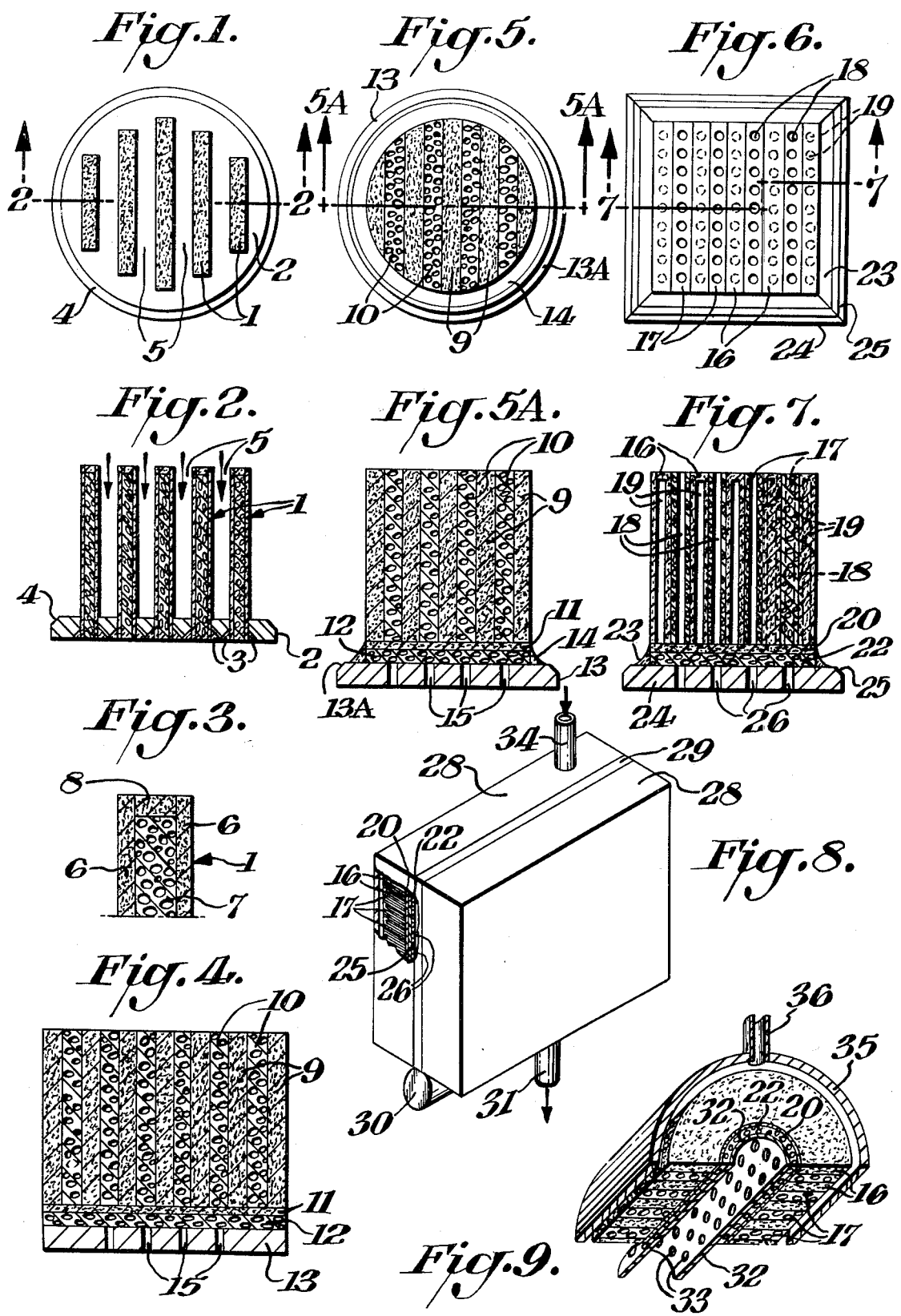

RETENTION MEANS FOR MECHANICAL SEPARATION AND PROCESS OF MAKING SAME

CROSS REFERENCE TO RELATED APPLICATION

This application is a division of application Ser. No. 402,331, filed on Oct. 1, 1973.

FIELD OF THE INVENTION

This invention relates to a retention means for mechanical separation apparatus used in clarifying or purifying fluid suspensions. The object of such a clarification is commonly the separation of suspended matter from a suspending fluid in order to provide a clarified fluid. The invention is more particularly related to the field of retention means for mechanical separation apparatus for clarifying hot, viscous, liquid suspensions such as the clarification of polymer melts and polymer solutions as is required immediately preceding an extrusion operation. However, the apparatus according to the invention also can be used in clarifying gaseous fluid media, and the suspended matter removed may be either solid or liquid. Typical clarifying processes employing apparatus according to this invention, in addition to clarifying polymer melts, are purification of hydraulic fluids, purification of lubricating oils, dust removal from flue gases, catalyst recoveries and removal of radioactive particles from liquid and air streams.

Clarification by filtration is a form of mechanical separation. Other mechanical separation operations include screening, centrifuging, settling and classifying. Thus, the use of the words "mechanical separation" in such phrases as "filtration by mechanical separation" might be considered redundant. However, filtration by other than mechanical separation means is technically feasible, such means being chemical or electrical clarification. These latter two means are generally not feasible in the areas of technology related to the present invention.

STATE OF THE ART

Known mechanical separation apparatus may be illustrated by U.S. Pat. Nos. 2,267,918, 3,722,696, 3,726,407, 3,729,279 3,728,061, 3,737,036 and 3,746,642. Normally they admit a fluid suspension under pressure to an enclosed space wherein the suspension is treated to remove the suspended matter and the clarified fluid is discharged therefrom. The suspended matter is retained within the enclosed space by some form of retention means. Typical retention means maintained within the enclosed space include sand packs, compressed metal packings, various configurations of screens, porous barriers such as porous metal tubes and porous ceramic discs. Laminated porous metal sandwich structures have also been suggested: U.S. Pat. Nos. 2,430,078, 2,997,777, 3,441,143, 3,481,479, and 3,581,902. The retention means within the enclosed space of the apparatus permits the fluid under pressure to flow through it due to its porosity but retains the suspended matter, normally due to its small pore size, thus permitting the clarified fluid to be discharged from the enclosed space of the apparatus.

Known mechanical separation apparatus such as for the clarification of hot polymer melts (e.g., U.S. Pat. Nos. 3,074,104 and 3,570,059) and solutions suffer a number of disadvantages, among them being the large volume of enclosed space within the apparatus relative to the volume of the retention means. This large volume of space may result in undesirable degradation of the fluid suspension and the clarified fluid materials due to the long time they are retained in the filtering cavity at the high temperature needed to maintain fluidity of the material. The degradation by-products promote inferior extrusion performance as well as production of off-grade products.

Another deficiency of known apparatus for clarification of fluid materials is the small surface area of the retention means available for fluid clarification with respect to the volume of the enclosed space. This may be caused by unused volume within the filter cavity or by the need for impervious structural support layers as illustrated by U.S. Pat. No. 3,581,902. The small area of retention means leads to inefficient use of the apparatus, high capital investment and installation costs, and low production rates. Frequent shutdowns to replace clogged retention means is a common deficiency of known apparatus.

In operations which make use of a "backwashing" technique to clear a used retention means of debris of a foreign nature, the physical characteristics of the retention means previously employed, particularly resistance to fracture, is often low so that backwashing pressure is limited to less than 200 lbs/in$^2$ and thus the cleaning of foreign matter from the retention means is far from complete. The use of a backwash pressure of 1,000 lbs/in$^2$ could improve the performance economics in a most worthwhile manner. By "backwashing" technique we mean to discontinue the normal flow for the purpose of clarification of fluid suspension through the retention means and to cause a reverse flow through the retention means in the opposite or backward direction to the flow direction during clarification. The backwashing fluid may be clarified fluid already produced or some other suitable fluid effective in dislodging foreign matter trapped within or on the retention means during the clarification phase. The reverse flow may be accomplished by suitable valving or other means isolating the backwash fluid and foreign matter from the fluid being clarified as well as the clarified product. Thus, backwashing made completely clear the filter or it prolongs the length of the clarification cycle before clogging reduces the usefulness of the retention means to an uneconomical value.

BRIEF DESCRIPTION OF THE INVENTION

The present invention is a novel filter element employing a specified retention means and a method of making same for use in an apparatus which clarifies fluid suspensions (gaseous or liquid) by mechanical separation. The invention is particularly adapted for use in an apparatus for clarifying hot polymer melts or hot polymer solutions but, as will be evident to one skilled in the art from the description herein, the invention has applicability to many other clarification processes and apparatus such as those mentioned above.

The retention means according to the invention is tailored to occupy an enclosed space, such as a chamber or cavity, in a known apparatus for clarifying fluid suspensions. The retention means is constructed of powders which have been sized and formed into laminated structures, normally plates, of interconnected pores by powder metallurgy techniques before assembly to form the said retention means.

While numerous powder metallurgy techniques may be employed to produce the laminated porous elements of this invention, the particularly preferred process is that described in copending patent application Ser. No. 229,823, filed Feb. 28, 1972, now U.S. Pat. 3,864,124, which application is in turn a continuation-in-part of application Ser. No. 818,781, filed Apr. 23, 1969, now abandoned, the teachings of these applications being incorporated herein by reference.

According to the present invention, the filter elements are made by the steps of (1) making two or more self-supporting and preferably flexible, cloth-like sheets containing about 80 volume percent, preferably about 85 volume percent or more on a solids basis of a sinterable, particulate material and the remainder substantially fibrillated polytetrafluoroethylene (PTFE) which upon sintering produce rigid layers of different pore size, (2) laminating the self-supporting sheets and assembling them in the desired configuration, (3) supporting the assembly in a furnace, (4) sintering to effect interparticle molecular or atomic bonding, and (5) removing of void-forming materials where necessary.

The novel retention means of the invention is characterized by a series of plate-like filter structures which provide a high ratio of retention surface area per unit volume of filter element, said ratio being greater than 4, and preferably greater than 10, and up to 60 or 70 and, wherein unused space within the filter housing cavity is to be minimized, by a similarly high ratio of volume of retention means per unit volume of the chamber or cavity enclosing it within the housing of the clarifying apparatus.

The retention means of the invention is further characterized by at least two normally parallel planar retention surfaces having a clarified fluid collection layer substantially perpendicular to said planar retention surfaces said retention surfaces being positioned substantially parallel to the direction of flow through the element. Close spacing between the retention surfaces is preferred, ranging from actual physical contact up to one to five inches apart. The retention means are so fabricated that when held within the housing cavity, fluid flow of the medium to be clarified is directed through the area of smallest pore size.

OBJECTS OF THE INVENTION AND ADVANTAGES OVER THE PRIOR ART

The chief object of the new apparatus is to overcome the disadvantages of known apparatus for clarification of fluid materials by mechanical separation, these disadvantages having been described above.

Another object of the invention is to provide an apparatus having low hold-up volume of treated or untreated fluid undergoing mechanical separation as well as an apparatus having large, useful retention area with respect to the volume of the filter element and the cavity within the apparatus, both of these objects being accomplished by tailoring the size, shape, and construction of the new retention means to fit the space, chamber, or cavity of a clarifying apparatus. Yet another object is to provide a retention means for mechanical separation, such retention means made from closely sized particulate materials such as powdered metals, ceramics, or polymers. Another object is to provide retention means constructed from laminated structures, normally plates, of interconnecting pores by powder metallurgy techniques. Another object is a retention means wherein the laminated structures are substantially parallel and closely packed. Yet another object is an apparatus comprising parallel retention structures which structures are laminated, the layers of the laminations having interconnecting pores of differing pore size one layer to the other. Another object is an apparatus incorporating a retention means or element wherein the interfaces between layers serve as retention surfaces. Another object is a retention medium having a clarified fluid collection layer substantially perpendicular to said parallel retention surfaces. Yet another object is a retention means fabricated in a manner directing fluid flow and distributing the flow over the areas of smallest pore size within said retention means. Another object is a retention means for a mechanical separation apparatus which means is a block of laminated porous parts fabricated into a bonded coherent entity by sintering. Yet another object is a laminated retention means wherein a thin layer of interconnecting small pores is reinforced by a thicker layer of larger, interconnecting pores to provide mechanical strength, to minimize fracture, and to maximize clarifying flow rate. Still another object is an apparatus comprising a housing, a cavity within the housing accepting a close-fitting, porous retention means, said retention means comprising parallel laminated porous plates having layers of differing interconnecting pore sizes, said parallel plates being in contact or spaced apart from each other. Another object is to provide a process for making a filter medium or element of close-fitting, porous, particle-retention character with respect to its housing, said medium or element comprising parallel laminated porous plates having layers of differing interconnecting pore sizes, said parallel plates being in contact with each other or closely spaced apart. A further object is to provide an improved filter element for use in clarifying and conditioning polymer melts prior to spinning the melt.

Other objects of the invention will become apparent as this description proceeds.

BRIEF DESCRIPTION OF THE FIGURES

FIG. 1 is a plan view of mounted elements of an extended-area filter element for hot polymer filtration. Details of the enclosure joining and filter plates are included.

FIG. 2 is a cross-sectional view taken along line 2—2 of FIG. 1 of an element of the extended-area filter element of FIG. 1. It shows in detail the manner of securing the plates in the base.

FIG. 3 is an enlarged cross-sectional view of a rectangular, laminated porous structure of the extended-area filter element of FIG. 2.

FIG. 4 shows a cross-sectional view of an extended-area filter medium comprising intercalated layers of porous metal of different pore size.

FIG. 5 is a plan view of another embodiment of a filter element according to the invention.

FIG. 5A is a cross-sectional view taken along 5A—5A of FIG. 5.

FIG. 6 is a plan view of an extended-area filter element having intercalated layers of porous metal which layers enclose ordered channels.

FIG. 7 is a cross-sectional view along line 7—7 of the extended-area filter element of FIG. 6.

FIG. 8 is a perspective view of two parallel plate filter blocks coupled to form a filter element with a pipe connector.

FIG. 9 is a sectional view of a cylindrical configuration of the parallel plate filter element.

DETAILED DESCRIPTION OF THE INVENTION

The term "extended-area filters" is used herein to describe a complete apparatus of the present invention which includes a housing, fluid inlet, cavity, fluid outlet and particle-retention means within the cavity. Filters customarily are divided into cake filters and clarifying filters. The distinction is that in cake filters the particulate material being removed from the fluid suspension is normally present in a relatively high concentration. It becomes the filter cake and it usually is the important product of the filtration. On the other hand, in clarifying processes the suspended material being removed from the fluid suspension is relatively low in concentration and it is usually a waste product, the economic product being the clear filtrate resulting from the clarification operation. Thus, the term "extended-area filter", though it might imply cake filtration and filter cake recovery as product, does not normally do so in this disclosure. However, since the retention means of the invention is not limited to use in the clarification mode, unique circumstances could well make it valuable for cake filtration as well.

Extended-area filters have, as an essential component, a suspended-matter or particle-retention means such as a porous structural boundary or barrier which permits clear fluid to flow through it due to an appropriately applied driving force but retains particulate material larger than the size of the pore openings. Commonly this particle-retention means is called a "filter medium" (a plural number being filter media) and the term will be so used in describing this invention despite any degree of inherent bulk, structural complexity, fabrication burden, or tortuosity of flow pattern. However, a filter medium after fabrication to tailor it to fit the cavity or chamber of the housing or an extended-area filter will be called a filter element. A filter element is a filter medium modified, for example, by machine tool methods, so that it can be sealed into the housing of the extended-area filter by known means such as metal O rings, graphite gaskets, and corrugated metal gaskets, for example.

One embodiment of the filter element according to this invention is described with reference to FIGS. 1, 2 and 3. Such a filter element is suitable for an extended-area filter for clarifying hot polymers. In this embodiment rectangular laminated porous metal plates of the type shown in FIG. 3 are mounted as depicted in FIGS. 1 and 2. The plate of FIG. 3 comprises an inner supporting layer 7 of porous material such as stainless steel having interconnecting pores greater than 20 microns in size and an outer, retention layer 6 of interconnecting pores smaller than those of the supporting layer. The plate is sealed on the three edges exposed to the fluid suspension being clarified so that the retention layer 6 covers all surfaces of supporting layer 7 which otherwise would be in contact with the fluid medium to be clarified. These filter plates are mounted in a suitable base 2 such as one of stainless steel as shown in FIG. 2.

The filter plates may be constructed by any suitable means but preferably they are constructed from self-supporting, cloth-like sheets of filled, fibrillated polytetrafluoroethylene (PTFE) made according to the process disclosed in copending patent application Ser. No. 229,823, filed Feb. 28, 1972. The procedure has the advantage of producing a flexible green sheet which can adapt itself, due to its drapeability and cloth-like nature, to a variety of configurations not obtainable when using the relatively stiff sheets of the prior art (e.g., U.S. Pat. No. 3,581,902). The cloth-like sheets preferred according to this invention generally are formed from about 85 to 99% by volume of a sinterable metal, alloy, intermetallic compound, ceramic, salt, plastic or the like and mixtures thereof and about 1 to 15% by volume PTFE. According to the process described in Ser. No. 229,823, PTFE powder, such as sold by E. I. duPont de Nemours & Company, Inc. under the trade name "Teflon 6c," is mixed dry with metal powder in a mill such as a ball mill that mechanically works the PTFE so as to enmesh the metal powder. Tumbling in a steel ball mill with ½-inch diameter steel balls for thirty minutes is adequate. The PTFE metal powder mixture is distributed over a one-sixteenth inch thick stainless steel supporting plate, and the whole is passed through heated rolls set at ¼-inch spacing. The rolled powder is folded on itself, rotated 90°, and again passed through the rolls. This cross-rolling step is repeated until the sheet becomes self-supporting. This normally occurs within four to eight passes. It is believed that the mechanical working fibrillates the PTFE and causes particle-to-particle bonding between the metal particles by means of the fibrils, fibrils actually adhering to the surfaces of the particles. The self-supporting sheet is then removed from the stainless steel plate and cross-rolled two or three times with the rolls set three-sixteenth inch apart. The thickness of the sheet is then reduced in steps of approximately 0.01 inch to that desired.

Sheets made by the process just outlined were prepared for use in fabricating the filter plates of FIG. 3. These sheets had the following compositions:

Sheet A. 81 volumes of −140 +170 mesh type 316L stainless steel powder, 9 volumes of stainless steel braze alloy powder, and 10 volumes of PTFE.

Sheet B. 68 volumes of −50 +80 mesh type 316L stainless steel powder, 17 volumes of stainless steel braze alloy powder, and 15 volumes of PTFE.

In both Sheets A and B the stainless steel braze alloy comprised 15% chromium, 3.5% boron and the balance nickel. The alloy was −150 mesh in particle size (United States sieve size is used here and throughout this application).

Outer or retention layers 6 of small pore size were formed from sheets of composition A and core or supporting layers 7 of larger pore size were formed from sheets of composition B. Sheets of composition A were rolled to a thickness of 0.020 inch and sheets of composition B were rolled to a thickness of 0.050 inch.

One sheet of composition B was sandwiched between two sheets of composition A and the sheets were then laminated to each other by any suitable means such as a glue comprising a saturated aqueous solution of sodium borate mixed with an organic thickening agent to increase the viscosity to the 50–100 poises range. Alternative means for attaching the presintered sheets include mechanical clips, crimping and glues such as thickened sodium silicate solutions, acrylic adhesives or any of the other well-known orgainc or inorganic adhesives which serve temporarily to bond the sheets prior to the sintering step hereafter described. It is also possible in accord with this invention, simply to ply the desired layers and then subject them to a rolling operation whereupon an interlocking will occur with or without crimping such as punching the plied layers at selected spots to enhance the interlocking of the layers.

The three remaining exposed edges of the sheet of composition B through which ingress would occur in the final filter plate were sealed by gluing in a strip 8 of Sheet A, 0.050 inch thick. The entire assembly was then pressed to insure good contact between the layers. Five filter plates were made in this manner. Their dimensions were adjusted to achieve the maximum number of plates in a circular area such as the configuration shown in FIG. 1. The filter plates were placed on a 0.080 inch thick sheet of fibrous aluminum silicate ("Fiberfrax", made by The Carborundum Company, Niagara Falls, N.Y.). The plates so supported were sintered at 115°C. for three hours in hydrogen with a dew point of less than −40°F. to achieve interparticle molecular bonding. After cooling in a hydrogen atmosphere to below 300°C., the sintered plates were removed and mounted on a solid stainless steel base 2 as shown in FIG. 2. The base had slots cut into it to correspond to the length and width of the filter plates. The space between the slots was 0.0625 inch. A special braze alloy 3 described below was used to braze filter plates 1 to base 2. Alternatively the plates may be attached to the base by welding or diffusion bonding.

Of particular advantage in the construction of the filter media of this invention and useful in joining other porous materials as well is a braze alloy that can be used to join porous metals to impervious structural components and to seal the edge of egress layers in sandwich-type porous filtration elements. The brazing alloy is particularly suited for joining porous metal surfaces to porous or non-porous metals and for sealing the outer surfaces of porous metals because it shows little tendency to wick into the pores of the porous metal and therefore does not destroy porosity. Although this objective has been sought by other formulations (e.g., U.S. Pat. No. 3,716,347), the braze alloy of this invention achieves the objective in a manner quite different from prior proposals. An alloy capable of achieving this objective is made by combining 75 volume percent of an alloy containing 15 weight percent chromium, 3.5 weight percent boron, and the balance nickel, with 25 volume percent of −325 mesh tungsten powder. This mixture is blended with an aqueous-base glue containing the saturation concentration of sodium borate and one weight percent of ethyl cellulose as a thickening agent. The blend of metallic powders with the liquid adhesive is adjusted to give a viscosity of approximately 10 poises. After firing, it forms a strong, impervious bond or seal.

The principal advantage of this brazing method over welding is that no stresses are set up within the porous metal in contact with it and no fluid penetrates into the pores. The brazing composition is particularly advantageous in that in the early stages of heating it rapidly becomes fluid so that it can penetrate the pores and wet the surfaces as is necessary for firm bonding. However, immediately after becoming thin, the mixture thickens and the flow into the pores is halted before substantial penetration takes place. While we do not wish to be bound by any theory, the thin and then thick phenomenon is believed the result of the following: after the nickel-chromium braze alloy initially melts and is thin, it almost immediately begins to react with the tungsten particles and the melt thickens before it can penetrate substantially into the pores. The degree or extent of pore penetration (that is, the length of time the melt remains thin) can be regulated by inter alia the ratio of braze alloy to tungsten powder. The thickening action results when the braze alloy dissolves tungsten metal, which increases the solidus temperature of the mixture to above ambient furnace temperature thus resulting in a freezing or thickening of the alloy. The life span of braze alloy in molten form is also determined by the rate and extent of the reaction with the tungsten which, in turn, is controlled by the concentration of tungsten, its particle size, and temperature. This novel brazing technique is operative in any composition wherein a braze alloy is mixed with a metal, alloy, or intermetallic compound that will react with the braze alloy to increase its solidus temperature to above ambient furnace temperature.

Generally, the novel compositions according to the invention comprise a braze alloy of conventional type containing a metal or alloy that has a melting point 100°C. higher, preferably 500°C. higher, than that of the braze alloy and which dissolves in the braze alloy. Suitable braze alloys can be found in Brazing Manual, American Welding Society, Inc., New York 1963. Within the principles of this invention, one can easily select the specific type, particle size and amounts of braze alloy and powdered metal or alloy which will give the desired effect.

Typical brazing alloys meeting the above objectives contain the following ingredients in the stated percents by weight:

|    | Ingredients | Weight Percent |
|----|-------------|----------------|
| A. | Chromium, tungsten, molybdenum, manganese, iron, nickel, tin, copper or mixtures thereof | 1 to 25% |
| B. | Boron, silicon, phosphorus, tin or mixtures thereof | 1 to 15% |
| C. | Nickel, cobalt, copper, silver, aluminum or mixtures thereof | balance |

From 50 to 95 volume percent of the above braze alloy is added to from 5 to 50 volume percent of:

Tungsten, vanadium, molybdenum, tantalum, titanium, chromium, iron, nickel or other metal whose melting point is above 1500°C. (hereafter referred to as "refractory metals"), or mixtures thereof.

As can be seen from the above table, the alloy elements in the braze alloy fall into three categories. First there is the base metal (group C) which may come from groups 1B, 3B and 8 or the Periodic Chart, usually nickel, copper, aluminum, silver, cobalt or mixtures thereof.

A second category of ingredients used in braze alloys consists of melting point decreasers (group B). These come principally from groups 4A and 5A of the Periodic Chart. They are usually boron, silicon, phosphorus or tin. The third category (group A) serves the function of improving mechanical properties—strength toughness, etc. This usually consists of one of the transition metals, the principal ones being chromium, tungsten, molybdenum, iron, nickel, tin, manganese, copper or combinations thereof. In the formulation according to the invention, these metals are prealloyed and used in some size fractions below 40 mesh.

The solidus-temperature increasing metals and alloys in the formulation are taken from groups 4B, 5B, 6B, 7B and 8 in the Periodic Chart. Examples of metals from these groups that can be used are vanadium, titanium, chromium, tungsten, molybdenum, tantalum, iron, nickel and alloys thereof.

illustrative specific compositions are listed below. Where not otherwise indicated, all percents are by weight:

1. 85 volume percent braze alloy
   - chromium 14 %
   - boron 3.5 %
   - silicon 4 %
   - iron 4.5 %
   - nickel balance;
   - particle size −150 +325 mesh

15 volume percent melting-point increaser
   - tantalum 100 %
   - particle size −325 mesh 2. 70 volume percent braze alloy
   - phosphorus 11 %
   - nickel balance;
   - particle size −150 mesh

30 volume percent melting-point increaser
   - iron 40 %
   - chromium balance;
   - particle size −200 mesh 3. 75 volume percent braze alloy
   - zinc 42 %
   - nickel 10 %
   - copper balance;
   - particle size −150 mesh

25 volume percent melting-point increaser
   - nickel 100 %
   - particle size 5 microns 4. 80 volume percent braze alloy
   - silicon 7.5 %
   - aluminum balance;
   - particle size −50 +100 mesh

20 volume percent melting-point increaser
   - titanium 100 %
   - particle size −100 +325 mesh Preferably the ingredients of the brazing composition according to the invention are in powdered form and ingredients A through C have been previously alloyed and comminuted before admixture with the powdered solidus temperature-increasing metal or alloy that increases the solidus temperature of the resulting brazing composition to above ambient furnace temperature.

A variation of this brazing procedure is to apply the solidus temperature-increasing component to the porous surface first and then, in a separate layer, apply the fluid-forming braze alloy. In such a process, the braze alloy melts, flows into the solidus temperature-increasing alloy, and solidifies before it emerges on the other side of the solidus temperature-increasing alloy layer. This has proved to be an effective means of sealing, though not as convenient as the single-layer technique first described.

The filter element shown in FIG. 2 was brazed in a hydrogen furnace at 1100°C. for fifteen minutes. Fiberfrax spacers were used between the filter plates to maintain uniform spacing.

The filter element according to FIGS. 1 through 3 was tested by placing it in the filter cavity of a spinpack used to make polyester fiber. The element was sealed into place by pressing an aluminum ring seal against the chamfered surface 4 in FIG. 2. The molten polymer ingressed into the filter plates 1 as shown by the arrows. Filtering occurred on the outer surfaces of retention layers 6. The filtered polymer flowed into the support layer 7 and egressed through the bottom unsealed edges of the filter element as shown in FIG. 2. The filtering life is proportional to the high surface area of the retention layer achieved by the parallel plate construction used in this example.

Another embodiment of a filter element in accord with this invention was made in which the filter plates were separated by a supporting layer (10) of porous stainless steel having low resistance to fluid flow. The basic construction is shown in FIGS. 4, 5 and 5A. Layers of Sheets A 9 and B 10, described supra, were each rolled to a thickness of 0.050 inch and were stacked alternately as shown in FIG. 4. The following gluing steps were accomplished with the help of the glue previously described and comprising a saturated aqueous solution of sodium borate mixed with an organic thickening agent to increase the viscosity of the glue to the 50 to 100 poises range. Over the bottom face of the edges of these stacked sheets 9 and 10 a 0.020-inch thick piece 11 of Sheet A was glued. Next to this, a 0.050-inch thick piece 12 of Sheet B was glued. A base plate 13, 0.250-inch thick, was glued to layer 12. This base plate was made in accordance with the process described for making Sheets A and B and was designated Sheet C. The composition of Sheet C is 95 volumes of −325 mesh type 316L stainless steel powder and 5 volumes of Teflon 6C. Holes 15 one-sixteenth inch in diameter were punched into Sheet C. The entire assembly shown in FIG. 4 was supported with 0.080-inch thick pieces of Fiberfrax on all six sides and wrapped with stainless steel wire. This assembly was then sintered for three hours at 1150°C. in hydrogen with a dew point of less than −40°F. After cooling to below 300°C. to prevent oxidation, the sintered assembly was removed and machined to a cylindrical configuration as shown in FIG. 5A. A chamfer 13A was machined into the base plate 13. The edge of layer 12 was sealed with the braze alloy composition described above. This was done in order to prevent fluid from entering the edges of layer 12, thereby bypassing the filter plates 9. The assembly was placed back in the hydrogen furnace set at 1100°C. for fifteen minutes to braze the edge of layer 12 and also to establish additional strength between the base plate 13 and layer 11.

This extended-area filter element was tested in a spinpack used for making polyester fiber. The filter block assembly was sealed on chamfered edge 13A. Molten polymer to be filtered ingressed through layer 10 and flowed into the filter plates 9. Layer 11 across the bottom prevented unfiltered passage of the fluid being filtered from ingress layers 10 to the collection layer 12. Filtration occurred at the interface between layers 10 and layers 9. The filtrate passed down layer 9 through layer 11 into the collection layer 12 and egressed through ports 15 in the base plate 13. The filtering life corresponded to the filtering area of plates 9.

The advantages of this structure are resistance to fracture due to the supporting layers 10 between layers 9, low construction costs, prefiltration of large particles in layer 10 and conditioning of molten polymer before passing through retention layer 9.

The filter elements just described can be varied by the introduction of ordered channels into the ingress and filtration layers to permit lower pressure drop across the filter when that is necessary. The construction of this type of filter element is depicted in FIGS. 6 and 7. Retention layers 16 in the elevation view of the filter element, shown in FIG. 7, are made from 0.050-inch thick pieces of Sheet A as previously disclosed. Support layers 17 are made from 0.050-inch thick pieces of Sheet B also as previously described. Straight channels 19 0.020 inch in diameter, shown in the plan view of the element depicted in FIG. 6, are fabricated into layers 16. As shown in FIG. 7, these egress channels 19 terminate within layers 16. Straight channels 18

0.020 inch in diameter are fabricated into the ingress layers 17. These channels traverse the entire length of the layer. The channels may be fabricated by incorporating into Sheets A and B fibers or filaments of a material such as an organic polymer that thermally decomposes without leaving significant carbonaceous residue or which does not melt at sintering temperatures and can be selectively dissolved in a post-sintering treatment. Alternatively, metal wires can be employed which melt during the sintering step (see, for example, U.S. Pat. Nos. 3,751,271 and 2,819,203). These fibers or filaments are placed between two filled PTFE sheets of the same composition, e.g., two of Sheet A and the sheets are rolled together to fix the filaments in place. Alternatively, the channels can be fabricated into Sheets A and B by embossing grooves into them by procedures taught in copending application Ser. No. 289,258 filed Sept. 15, 1972 the disclosures of which are incorporated herein by reference.

After sheets A and B containing the plastic filaments have been fabricated, they are laminated in the arrangement shown in FIG. 7. The sodium borate adhesive composition described previously is used to hold the layers together although any alternative mechanical or chemical adhering means can be employed. Layer 20 is then attached to the edge of the stacked assembly as shown. This layer is formed of Sheet A rolled to a thickness of 0.020 inch. Next to layer 20 is glued a layer 22 made from sheet B 0.050-inch thick. Layer 22 can be eliminated when base plate 24 is channeled and ported to function as a collection layer as well as a support. Finally, the base plate made from Sheet C as previously described is attached to layer 22 using for example the sodium borate adhesive composition. The base plate has holes 26 punched into it as shown in FIG. 7. The layered assembly is supported in a Fiberfrax encasement and sintered for three hours at 1150°C. in hydrogen with a dew point of less than −40°F. After cooling to below 300°C., the sintered assembly is removed and machined as shown in FIGS. 6 and 7. The base plate is chamfered 25. A strip of braze alloy is formed by making a filled PTFE sheet containing 72½ volumes of braze alloy, 22½ volumes of tungsten powder, and 5 volumes of Teflon 6c in accordance with the procedure given in the first Example above. This strip is glued to the edges of layers 20 and 22, using the sodium borate adhesive. The filter element is heated to 1100°C. for 15 minutes in hydrogen with a dew point of less than −40°F. to melt the braze alloy in the braze-tungsten mixture. This seals the edges of layer 22.

Fluid medium to be clarified travels down the straight channels in the ingress or support layers 17 shown in FIG. 7 and flows into the filtration or retention layers 16. Layer 20 prevents passage of unfiltered medium from the ingress layer 17 to the collection layer 22. Filtration occurs at the interface between layers 16 and 17. Filtered polymer flows to the straight channels 19 in the filtration layer 16 and out through layers 20 and 22. From layer 22 the fluid flows out of exit ports 26 in base 24. Layer 20 not only prevents leakage of fluid from ingress layers 17 but also blocks leakage of unfiltered fluid through cracked or broken filtration layers 16.

Instead of long internal channels 18 and 19 in layers 17 and 16 respectively, shorter channels lying in the plane of these layers can be used. The channels in layer 16 are parallel to the large surfaces of 16 and are orthogonal to the plane of the base plate. The arrangement of the channels in ingress layer 17 would lie parallel to its surfaces but could be parallel and orthogonal to the plane of the base plate. This filter element has the advantages of lower construction cost, relatively low resistance to flow, ruggedness, depth filtration and preconditioning of molten polymer or conditioning the polymer before passage through the retention layer.

In this invention, the size of pores in the retention and support layers such as the porous metal that comprises layers 16 and 17 is adjusted to meet specific requirements. The pores in layer 16 are adjusted on the basis of the size of particles to be removed from the fluid being filtered and may vary from about 0.1 to about 100 microns. The pores in support layer 17 are adjusted to reduce resistance to flow and to achieve the desired amount of prefiltration, if any, and may range from 20 to 1,000 microns. Generally, this pore size is larger than that in retention layer 16.

The extended-area filter elements described above can be assembled into a number of configurations to meet specific requirements. One such configuration is depicted in FIG. 8. Filter blocks having the parallel plate structure depicted in FIG. 7 are placed within housing 28 so that the supporting plates 24 adjoin collection cavity 29. Collection cavity 29 is sealed on the exposed edges and open to exhaust manifold 30. Fluid to be filtered flows into the housing through inlet pipe 34 and then into the ingress or supporting layers 17 of filter blocks 28 and egresses through filtration or retention layers 16 to the collection cavity 29. From there, filtered and clarified fluid flows down to manifold 30 and out the outlet pipe 31.

The basic structure depicted in FIG. 7 can also be arranged in a cylindrical design, a cross section of which is shown in FIG. 9. Fluid enters housing 35 through inlet pipe and ingresses through layers 17 and is filtered at the interface between 17 and 16. Filtered fluid flows from 16 through blocking layer 20 into collection layer 22 and finally through holes 33 in the supporting pipe 32 which performs the function of the base plate 24 in FIGS. 7 and 8. The upper end of pipe 32 is closed to prevent passage of fluids into the pipe without passing through the filter plates. Filtered fluid egresses from housing 35 through the core pipe 33 as shown by the arrow in FIG. 9.

The filter elements according to this invention can be fabricated from metals or alloys such as described in the above examples or from any solid inorganic or organic material capable of being sintered above 200°C. including ceramics such as fused silica or mullite, or plastics such as PTFE. Generally it is only required that the material be sinterable and that it have sufficient strength and chemical resistance for the intended field of application. Sintering processes are per se well known in the art and suitable conditions can be easily determined using known considerations such as described in Treatise on Powder Metallurgy, Vol. 2, Claus Goetzel, Interscience Publishing Co. 1950 and Introduction to Ceramics, W. D. Kingery, John Wiley & Sons, 1960.

The basic structure of the extended-area filter element pictured in FIGS. 6 and 7, having the previously described ordered channels in the ingress and filtration layers, can be made from alumina or other ceramics in the following manner. First, self-supporting sheets of filled, fibrillated PTFE are made in accordance with the process described in U.S. Application Ser. No. 229,823. In this precess, PTFE (Teflon 6C) is dry mixed with alumina powder in a mill that mechanically works the PTFE. Tumbling in a steel mill containing ½-inch steel balls for thirty minutes is adequate. The PTFE-alumina powder mixture is placed on a one-sixteenth inch stainless steel supporting plate and passed through heated rolls set at approximately ¼-inch spacing. The rolled powder sheet is folded on itself, rotated 9o°, and again passed through the rolls. This cross-rolling step is repeated until the sheet becomes self-supporting. This normally occurs within four to eight passes. The self-supporting sheet is then removed from the stainless steel support and cross-rolled two or three times with the rolls set three-sixteenth inch apart.

Sheets of the following compositions are prepared.

Sheet D. 90 volumes of −140 +170 mesh alumina powder and 10 volumes of PTFE

Sheet E. 85 volumes of −50 +80 mesh alumina powder
and 15 volumes of PTFE

Straight channels can be fabricated into Sheets D and E by incorporating into them fibrils of an organic polymer that thermally decomposes without leaving significant carbonaceous residue. The thickness of the sheet, with or without added organic fibrils, is then reduced in steps of approximately 0.010 inch to the final thickness desired.

The filter element depicted in FIGS. 6 and 7 is constructed as follows. Layers 16 in the side view of the filter element, shown in FIG. 7, are made from 0.050-inch thick pieces of Sheet D containing straight channels 19 0.020 inch in diameter, shown in the top view of the element, FIG. 6. As shown in FIG. 7, these egress channels 19 terminate with layers 16. Layers 17 are made from 0.050-inch thick pieces of Sheet E containing straight channels 18, 0.020 inch in diameter, which traverse the entire length of the layer. The channeled layers 18 and 19 are laminated in the arrangement shown in FIG. 7. An acrylate adhesive is used to hold the layers together. Layer 20 is then attached to the edge of the stacked assembly as shown. This layer is formed of Sheet D rolled to a thickness of 0.020 inch. Next to layer 20 is glued a layer 22 made from Sheet E, 0.050-inch thick, tapered as shown. The layered assembly is supported in a graphite encasement and fired for one hour at 1600°C. in nitrogen. After cooling, tapered layer 22 is ground to fit into base plate 24. Base plate 24, which is made from Sheet C as previously described, has holes 26 punched into it and is shaped as shown in FIG. 7. The stainless steel base plate is sintered for three hours at 1150°C. in hydrogen with a dew point of less than −40°F. After cooling to below 300°C., it is removed and machined so that a good fit is achieved between tapered layer 22 and base plate 24. Graphite foil can be used to improve the seal in this tapered joint which seals the edges of layer 24. Material to be filtered travels down the straight channels in the ingress layers 17, shown in FIG. 7, and flows into the filtration layers 16. Layer 20 prevents passage from the ingress layer 17 to the collection layer 22. Filtration occurs at the interface between layers 16 and 17. Filtered polymer flows to the straight channels 19 in the filtration layer 16 and out through layers 20 and 22. From layer 22 the fluid flows out of exit ports 26 in base 24. Layer 20 not only prevents leakage of fluid from ingress layers 17 but also blocks leakage of unfiltered fluid through cracked or broken filtration layers 16.

In the production of synthetic fibers, the filter just preceding the spinnerets performs the dual function of removing contaminant particles and conditioning the polymer. Conditioning of the polymer (such as by shearing) is necessary in order to break up gel particles and convert cross-linked molecules into long-chain molecules. The filters of this invention provide three options for conditioning. One option is to condition the molten polymer in ingress layers--layer 10 in FIG. 5 and layer 17 in FIG. 7--prior to filtration. Another option is to condition the polymer in the core layer 7 of FIG. 3 after filtration. The third option is to condition the polymer in porous layers 20 and 22 in FIG. 7 that are orthogonal to the filter plates and direction of flow. Other layers can be placed in juxtaposition with layer 22 in FIG. 7 in order to achieve further conditioning through successively smaller pore-size layers. Conditioning can also be achieved by substituting for base plate 24 in FIG. 7 or 13 in FIG. 5 layers of screen rimmed with a stainless steel band. This stainless steel band would then serve as a gasket seat for sealing the assembly into a filter cavity. The filters of this invention encompass conditioning the polymer in any of these three modes or combinations thereof.

When proceeding with option three, conditioning after filtering, it will be seen from the above that a number of structures according to the invention are possible. One or more porous layers may be placed orthogonal to the filter plates and direction of flow (where a single plate is employed, it normally will have a pore size sufficiently small substantially to prevent passage of the material to be filtered from the fluid medium).

Generally, the porous layers employed when conditioning is desired are so constructed that they increase the tortuosity of the path of the fluid medium in the direction of flow and an increase in surface roughness within the pore structure is also advantageous. Tortuosity is defined as the ratio of the distance that a fluid travels in passing through a porous medium to the thickness of the medium.

Tortuosities can be increased to over 2 by laminating into porous media shear planes random or ordered deflecting layers that substantially change the line of flow from the direction of the pressure gradient towards a direction that is orthogonal to the pressure gradient. Such a structure can be made according to this invention by distributing over Sheet A, rolled to a thickness of 0.050 inch, ⅛-inch squares of Sheet C that has been rolled to a thickness of 0.030 inch. These pieces of Sheet C are equally spaced to cover 10 percent of the area. Over these, to form a sandwich, is placed another piece of Sheet A, 0.080-inch thick. The sandwich is rolled to a thickness of 0.15 inch. The sheet is folded on itself, rotated 90°, and rolled again 0.15 inch. This is repeated two more times to produce eight planes in the structure having enlarged platelets of Sheet C. The structure is sintered at 1150°C. for two hours to bond the particles metallurgically and to remove the PTFE. The resulting structure comprises impervious platelets formed from Sheet C interspersed within a porous sheet formed from Sheet A. As will be evident, when the fluid medium passing through the porous portion of the sheet strike the impervious platelets arranged orthogonal to the pressure gradient, the direction or line of flow is changed in the desired manner.

Alternative to this, a high tortuosity, ordered shear plane can be made by intercalating eight 0.020-inch thick pieces of Sheet A with eight 0.010-inch thick pieces of Sheet C, perforated with ⅛-inch holes in sufficient numbers to create 30 percent open area in Sheet C. This assembly is rolled to a thickness of 0.150 inch and sintered at 1150°C. for two hours. In practice, the fluid medium passed through the porous layers within the sheet formed from Sheet A. When reaching impervious layers formed from Sheet C, the medium must flow laterally until it finds a hole or perforation. Since the perforations within each of the layers formed from Sheet C are not aligned, the flow through the shear plane has the desired high tortuosity. Holes can be arranged to channel transverse flow so as to obtain macromixing of the filtrate streams.

Internal roughness can be incorporated into the structure by modifying the composition of Sheet A through the addition of ten volumes of 10-micron stainless steel powder. This results in a structure after sintering in which larger sintered −140 +170 mesh particles are sinter-coated with 10-micron particles, thus enhancing the shearing effect of the walls of the pore structure.

These porous structures for increasing tortuosity and internal surface roughness can be used as the base plate 24 in FIG. 7 or (13) in FIG. 5 or used as a separate plate that underlies the base plates of the filters of this invention or any other polymer filters.

The base plate of the filters in FIGS. 5 and 7 can also be screen rimmed with a stainless steel band. Moreover, the edges of the base plate and/or porous collection layers underlying the filter plates and acting as egress and/or conditioning layers may be sealed by a sintered metal sheet. In this latter embodiment, a flexible, filled metal sheet as described earlier may be wrapped around the stacked egress and/or conditioning layers (e.g., layers 11 and 12 in FIG. 5A) and temporarily adhered thereto in any suitable manner. Upon sintering, permanent bonding occurs and an essentially non-porous surrounding and sealing structure results (if porous, the pores are generally smaller than the pore size of the retention layer). Final sealing may be accomplished where necessary by the braze alloy composition earlier described.

The filter elements of this invention permit the use of backwash pressures generally higher than can be employed with conventional filters. Although the precise backwash pressure is determined by the type of contaminant, backwash fluid and other considerations well known to those skilled in the art, pressure can range as high as 20,000 psi in the case of a 5-micron porous stainless steel retention layer and as low as 300 to 400 psi or less for a 500-micron porous stainless steel retention layer.

The fluid medium to be clarified is normally passed through the filter element of this invention under a pressure differential. The magnitude of the pressure depends inter alia upon pore diameter, pore volume, thickness and viscosity of the fluid medium. For hot polymer filtrations, gradients up to 10,000 psi frequently are used. For low viscosity fluids such as gases, flow through the filter element can occur at pressure drops as low as 0.05 psi. Generally, pressure differentials between about 0.1 and 20,000 psi are used in most clarifying applications.

The filter elements of the present invention may be utilized to remove suspended matter (liquid or solid) from a fluid medium (liquid or gas). The retention means of this invention normally functions by having a pore size smaller than the size of the suspended matter to be removed. However, in the case of removing liquid-phase particles from gases, the retention layer serves to coalesce the liquid, allowing the separated gas to pass through it while the liquid is collected in or on the layer and may flow away in film form or as large drops. Liquid phases immiscible in the fluid medium, such as oil in water, are separated due to the characteristics of one of the phases to wet and adhere to the retention medium while the other phase passes through the retention medium.

Although the invention has been illustrated by the use of series of filter structures comprising two porous layers having different pore size, it is, of course, possible to employ additional layers of different pore size in each filter plate so that the fluid medium encounters successively smaller pores in its passage through the filter element. The use of additional porous layers is of advantage wherein one desires to prefilter larger particles before removal of the smaller particles or to achieve various effects in preconditioning the polymer melts before filtration. The use of more than two porous layers laminated to the porous support layer may also serve to reduce the pressure needed to pass the fluid medium through the filter element and increase the loading or separating capacity.

Furthermore, the number and porosity of base plates and porous collection layers (e.g., 11–14 in FIGS. 4 and 5A) may vary depending on the needs of the user and may be replaced by or combined with screens or other layers permitting passage of the clarified fluid medium. In the figures we have illustrated the invention by the use of two collection layers and a base plate. However, as will be evident, only one layer can be employed to serve the function of both the collection layer and the base plate. In such instance, the single layer will have a pore size sufficiently small to prevent substantial passage of the material to be filtered from the fluid medium. In the case of polymer melt filtration, screens or porous metal plates may be properly combined to cause post-conditioning of the melt after filtration.

The number of individual laminated filter plates is chosen with regard to the size and construction of the filter apparatus and the particular circumstances of the filtration desired. The number of laminated plates can range from at least 2 up to 200 or more. The particular size and shape of the plates is also a matter of choice and can vary to suit the particular needs of the desired filtration and size and shape of the filter apparatus.

While the invention has been described with the use of sintered porous metal sheets as the ingress and egress layers and this construction is generally preferred for most applications, there are special circumstances in which the use of corrugated metal layers may be used. For example, when removing tightly bound dirt particles during the clearing procedure, it is necessary to pass a large amount of fluid in the reverse direction through the filter. To do this, a very open egress layer is helpful in order to obtain a uniform distribution of backwashing pressures and to render the cleaning process easier and more efficient. In these instances, a corrugated metal sheet can be used to replace the above-described larger pore porous metal sheets as either the ingress (e.g., layer 10 in FIG. 5A) or the egress (e.g., layer 7 in FIG. 3) layers.

Another embodiment according to the invention is to substitute for retention layer 9 in FIG. 5A, a filter plate of the construction shown in FIG. 3. This filter plate may be formed from a porous metal sheet as described in connection with FIG. 3 or it may have a corrugated metal sheet instead of porous metal for the egress layer 7. Such a structure would provide for preconditioning of the polymer as it entered into ingress layers 10 and, at the same time, would provide for a more uniform-back pressures over the entire length of the retention layers 9 during backwashing when cleaning.

In the embodiment wherein a corrugated metal sheet replaces all or part of the larger porous metal ingress or egress sheets, it is preferred that the corrugated metal core have over 50 volume percent open space and essentially straight channels whose size is greater than one-third the thickness of the core layer. The corrugated metal sheet may be made from any metal which resists the condition or use for the filter. Stainless steel is preferred but other metals may be used such as steel, copper, nickel, monel, titanium, and the like and alloys thereof. The corrugations normally run in the direction of flow through the filter. Such structures may be made as follows.

To make a filter of the configuration shown in FIGS. 1, 2, and 3, a corrugated stainless steel sheet 0.075-inch thick and having six corrugations per inch with perforations through the corrugated metal is used instead of Sheet B. To insure that the retention surface formed by Sheet A adheres to the corrugated stainless steel, a thin layer of the previously described braze alloy may be used to fasten Sheet A to the corrugated metal. As in FIG. 3, the remaining three exposed edges are sealed by gluing to them a strip 8 of Sheet A 0.050-inch thick. In order to enhance brazing or sintering of Sheet A to the corrugated stainless steel, it may be desirable in some instances to grit blast the surface of the corrugated metal to roughen it sufficiently to promote interatomic bonding. After forming the structure of FIG. 3, the remaining steps in the production of the filter element is the same as described previously.

The flexible, cloth-like sheets preferably used according to this invention have been described above as made from PTFE but other suitable polymers performing in a like manner may also be used. Generally such suitable polymers have a high degree of crystallinity, above 50 percent, and a non-spherulitic structure. The polymer should also be flexible and, hence, a high degree of cross-linking, which decreases flexibility should generally be avoided. Lastly, the polymer must be capable of substantially complete decomposition at the sintering temperature without leaving a residue which adversely affects the resulting sintered structure for its intended use. Polyvinylidene fluoride has been tested and is suitable for making the flexible preforms although PTFE is the preferred polymer.

What we claim is:

1. In the method of joining two metal articles, at least one of which is porous, wherein a braze composition is contacted with the surface of the articles to be joined, the braze composition is heated to melt the composition and wet the surfaces to be joined and the braze composition is then cooled and a bond is formed between the articles, the improvement of preventing substantial penetration of the braze composition into the porous metal article which comprises contacting the surfaces of the articles to be joined with a braze composition comprising a powdered braze alloy and a metal powder whose melting point is at least 100°C. higher than that of the braze alloy and which dissolves in the braze alloy when the alloy is molten, heating the braze composition to and maintaining it at a temperature above the melting point of the braze alloy but below the melting point of the metal powder for a time sufficient for the braze alloy to melt and wet the surfaces to be joined and for the braze alloy then to dissolve sufficient metal powder to raise the solidus temperature of the resulting mixture to above the temperature at which the composition is maintained, whereby the mixture thickens without substantial penetration into the pores, and cooling the mixture and forming a bond between the articles.

2. The method according to claim 1 wherein the braze composition contains from about 50 to 95 volume percent of a nickel-, cobalt-, iron-, copper- or silver-based braze alloy and the remainder is a metal powder melting at least 100°C. higher than the melting point of the braze alloy.

3. The method according to claim 1 wherein the braze composition contains from about 50 to 95 volume percent of a powdered braze alloy consisting essentially of the following ingredients in the indicated percents by weight:

| Ingredient | Percent |
| --- | --- |
| chromium, tungsten, molybdenum, manganese, iron, nickel, tin, copper or mixtures thereof | 1 to 25 |
| boron, silicon, phosphorus, tin or mixtures thereof, and | 1 to 15 |
| nickel, cobalt, copper, silver, aluminum or mixtures thereof | balance | and from 5 to 50 volume percent of a powdered refractory metal.

* * * * *